(12) United States Patent
Rust

(10) Patent No.: US 7,272,582 B2
(45) Date of Patent: Sep. 18, 2007

(54) FEE DETERMINATION DEVICE

(75) Inventor: Langbourne W. Rust, Briarcliff Manor, NY (US)

(73) Assignee: Data Gater, LLC, Briarcliff Manor, NY (US)

( * ) Notice: Subject to any disclaimer, the term of this patent is extended or adjusted under 35 U.S.C. 154(b) by 0 days.

(21) Appl. No.: 11/055,730

(22) Filed: Feb. 10, 2005

(65) Prior Publication Data

US 2006/0178999 A1 Aug. 10, 2006

(51) Int. Cl.
*G06G 99/00* (2006.01)
*H04K 1/00* (2006.01)
*H04L 9/00* (2006.01)

(52) U.S. Cl. .............................. 705/50; 705/51; 705/77

(58) Field of Classification Search .................. 705/10, 705/400, 7; 709/224; 713/202, 93
See application file for complete search history.

(56) References Cited

U.S. PATENT DOCUMENTS

| 5,671,412 | A | * | 9/1997 | Christiano | ............... 707/104.1 |
| 5,757,304 | A | | 5/1998 | Redford et al. | |
| 5,819,092 | A | * | 10/1998 | Ferguson et al. | ............ 717/113 |
| 5,845,065 | A | * | 12/1998 | Conte et al. | ................... 726/31 |
| 6,069,941 | A | | 5/2000 | Byrd et al. | |
| 6,078,891 | A | | 6/2000 | Riordan et al. | |
| 6,112,181 | A | * | 8/2000 | Shear et al. | ...................... 705/1 |
| 6,236,975 | B1 | * | 5/2001 | Boe et al. | ........................ 705/7 |
| 6,282,535 | B1 | * | 8/2001 | Pham et al. | ...................... 707/4 |
| 6,473,794 | B1 | * | 10/2002 | Guheen et al. | .............. 709/223 |
| 6,519,571 | B1 | * | 2/2003 | Guheen et al. | ................ 705/14 |
| 6,519,572 | B1 | | 2/2003 | Riordan et al. | |
| 6,658,567 | B1 | * | 12/2003 | Barton et al. | ................ 713/193 |
| 6,691,116 | B1 | | 2/2004 | Bart | |
| 6,714,925 | B1 | | 3/2004 | Barnhill et al. | |
| 6,807,532 | B1 | * | 10/2004 | Kolls | ........................... 705/10 |
| 6,810,391 | B1 | | 10/2004 | Birkhoelzer et al. | |
| 6,826,540 | B1 | * | 11/2004 | Plantec et al. | ................. 705/10 |
| 6,895,383 | B2 | * | 5/2005 | Heinrich | .......................... 705/7 |
| 7,089,208 | B1 | | 8/2006 | Levchin et al. | |
| 2001/0003099 | A1 | * | 6/2001 | Von Kohorn | ................. 463/40 |
| 2001/0029491 | A1 | * | 10/2001 | Yoneta et al. | .................. 705/53 |
| 2002/0010679 | A1 | * | 1/2002 | Felsher | ......................... 705/51 |
| 2002/0016731 | A1 | * | 2/2002 | Kupersmit | .................... 705/10 |
| 2002/0059030 | A1 | * | 5/2002 | Otworth et al. | ............... 702/19 |
| 2003/0046140 | A1 | * | 3/2003 | Callahan et al. | .............. 705/10 |
| 2003/0061132 | A1 | | 3/2003 | Yu, Sr. et al. | |
| 2003/0069749 | A1 | * | 4/2003 | Shear et al. | .................... 705/1 |

(Continued)

OTHER PUBLICATIONS http://oira.syr.edu/oira/Assessment/Scanning/Charges.htm "Fees for Scoring and Analysis Services".*

(Continued)

*Primary Examiner*—Andrew J. Fischer
*Assistant Examiner*—Evens J Augustin
(74) *Attorney, Agent, or Firm*—Brooks, Cameron & Huebsch, PLLC

(57) ABSTRACT

Methods and electronic architectures for volume based handling and processing electronic data, for which a fee is determined based on a selectable metric, are provided. One embodiment includes program instructions for collecting non-aggregated data in an encrypted form that cannot be accessed or presented in aggregation for analysis without first being decrypted. The process of decryption allows for the determination of the fee based on a selectable fee metric associated with the decryption.

24 Claims, 5 Drawing Sheets

U.S. PATENT DOCUMENTS

| | | | |
|---|---|---|---|
| 2003/0105855 A1* | 6/2003 | Wynnyk | 709/224 |
| 2004/0039916 A1* | 2/2004 | Aldis et al. | 713/177 |
| 2004/0054930 A1* | 3/2004 | Walker et al. | 713/202 |
| 2004/0078236 A1* | 4/2004 | Stoodley et al. | 705/2 |
| 2004/0078578 A1* | 4/2004 | Khandelwal et al. | 713/185 |
| 2004/0093599 A1* | 5/2004 | Reynaud | 717/177 |
| 2004/0122707 A1* | 6/2004 | Sabol et al. | 705/2 |
| 2004/0193545 A1* | 9/2004 | Shlasky | 705/59 |
| 2004/0260658 A1* | 12/2004 | Dettinger et al. | 704/400 |
| 2005/0251488 A1* | 11/2005 | Saunders et al. | 705/59 |
| 2006/0235758 A1 | 10/2006 | Schleicher | |
| 2006/0294025 A1 | 12/2006 | Mengerink | |

OTHER PUBLICATIONS http;//webhelp.esri.com/arcgisdesktop/9.2/index.cfm?TopicName=Data_maintenance_strategies "Data Maintenance strategies".* www.spss.com/spss/licensing.htm "licensing strategies".*

* cited by examiner

FEE DETERMINATION DEVICE

TECHNICAL FIELD

The present invention relates to systems and methods for handling and processing electronic data, and in particular to systems and methods for volume based processing of electronic data.

INTRODUCTION

Market research and analysis is an expensive and time consuming process. Marketing research and analysis is, however, imperative to understanding your customers and trends that develop in the market place. This information, in turn, provides information necessary for making sound business decisions. To take full advantage of the information gathered during marketing research often requires the use of sophisticated software data analysis programs.

Typically, these sophisticated software data analysis programs involve a heavy, up-front fee to the consumer, and are associated with numerous (and often inconvenient) legal and software restrictions on duplicating, distributing and migrating the software from one computer platform to another. Other types of data analysis software include those having low or voluntary fees with little or no control over use, duplication or fee collection. These types of software programs typically work on an honor system, with clients free to download and try out the software, and encouraged to send a fee to the programmer if they decide to use it for business purposes. Yet another data analysis software module includes those having most of the program reside securely on a central server with only limited components installed on the client computers, the two computers working together over an internet link. In this model, software usage gets monitored from the server side of the system.

Each of these data analysis models, however, has limitations. For example, the up-front fee system sets up a serious barrier to acquisition as statistical and form-building software packages often cost thousands of dollars. Customers who are not sure they will be using the program frequently will be reluctant to acquire it. People who might prefer to deploy it across several computers are discouraged from doing so by need to buy multiple licenses to do so. This type of software also typically has a steep learning curve employing its own unique language and conceptual framework.

In contrast, the shareware distribution is prey to exploitation by non-paying users and seldom generates enough revenue to support a viable business. Finally, the web-tethered systems require users to be hooked up to the internet, thus putting potential limits on potential usage scenarios. Web-tethered systems may also have limits on the analysis that can be mediated through an internet browser, which severely restricts the power of what the analysis can do. And in the past, web-tethered businesses have kept (and billed for) a major share of the aggregation and analytical work, thus limiting the flexibility and power of the client to do their own analysis and/or maintain exclusive control over their data. This can also compromise the privacy of the data.

DETAILED DESCRIPTION

Embodiments disclosed herein are directed to methods and electronic architectures for volume based handling and processing electronic data for which a fee is determined based on a selectable metric. The embodiments described herein include computer executable instructions (hereinafter "program instructions") for collecting non-aggregated data in an encrypted form that cannot be accessed or presented in aggregation for analysis without first being decrypted. The process of decryption allows for the determination of the fee based on a selectable fee determination metric (hereinafter "selectable metric") associated with the decryption. Examples of the selectable metric for handling and processing electronic data can include bytes processed, a processor usage, a number of surveys processed, a number of clicks to a browser interface, informational content processed, a volume of memory accessed, field types utilized, and code types, e.g., analyst codes, evaluation codes, etc., utilized in handling and processing the electronic data.

Figure 1:
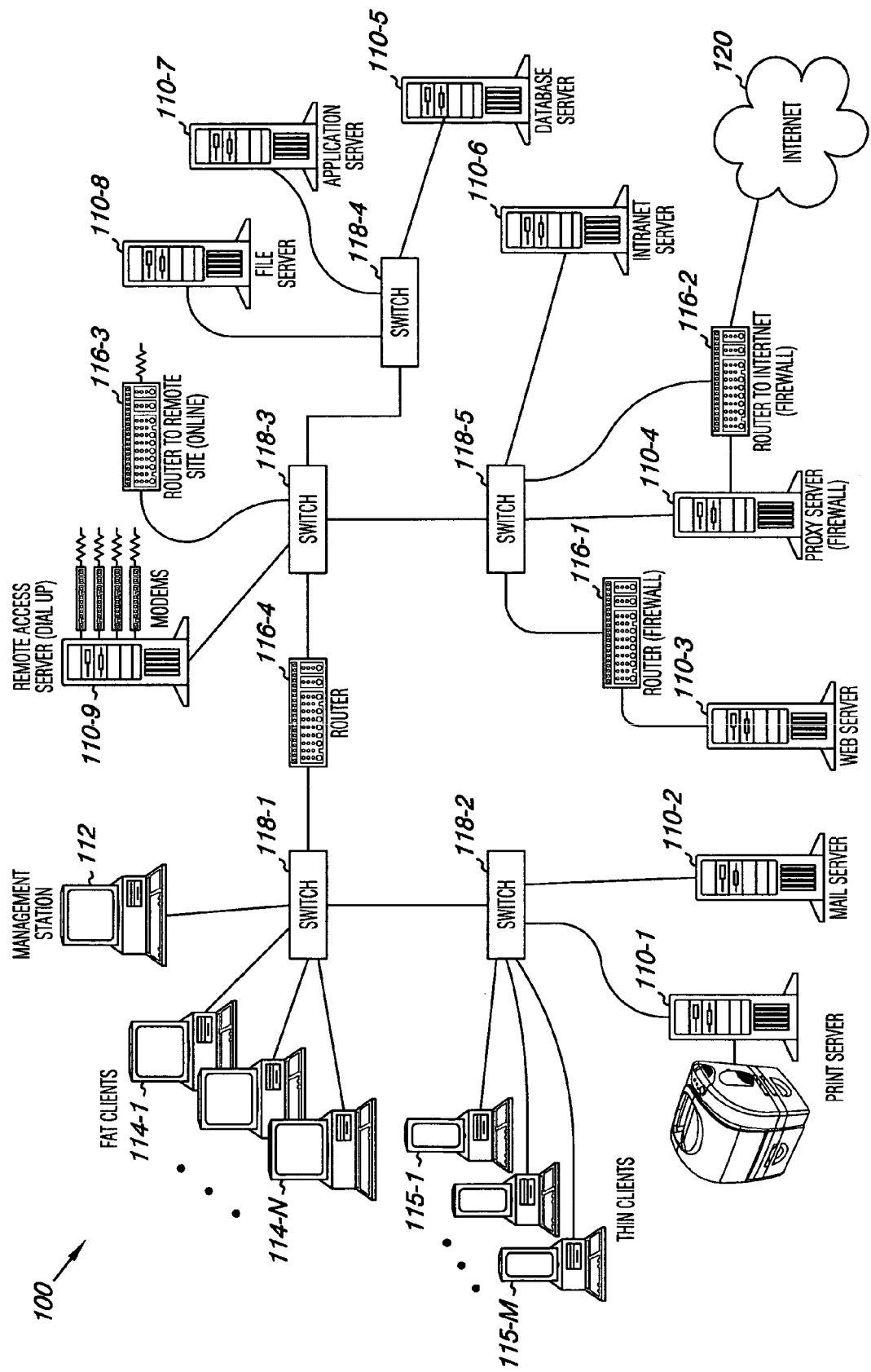
FIG. 1 is an embodiment of a computing device network.

FIG. 1 is an embodiment of a computing device network 100. As shown in FIG. 1, a number devices, e.g., PCs, servers, peripherals, etc., can be networked together via a local area network (LAN) (e.g., an Ethernet network), a wide area network (WAN), a wireless local area network (WLAN) the public switched telephone network (PSTN), and/or the Internet using transmission control protocol/Internet protocol (TCP/IP) via routers, hubs, switches and the like (referred to herein as "network devices").

The embodiment of FIG. 1 illustrates clients and servers in a LAN. However, embodiments of the invention are not so limited. For example, the embodiment of FIG. 1 shows various servers for various types of service on a LAN. The exemplary network of FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. Again, the examples provided here do not provide and exhaustive list. The embodiment of FIG. 1 further illustrates a network management station 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multifunction devices, e.g., PDAs, PC tablets, cellphones, and the like. The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1,

118-2, 118-3, 118-4, and 118-5, as the same are known and understood by one of ordinary skill in the art. Embodiments of the invention, however, are not limited to the number and/or type of network devices in FIG. 1's illustration.

As one of ordinary skill in the art will appreciate, many of these devices include processor and memory hardware. By way of example and not by way of limitation, the network management station 112 will include a processor and memory as the same are well known to one of ordinary skill in the art. Similarly, the network devices of routers, 116-1, 116-2, 116-3, and 116-4, and hubs and/or switches 118-1, 118-2, 118-3, 118-4, and 118-5 may include processor and memory resources. Embodiments of the invention are not limited, for the various devices in the network, to the number, type or size of processor and memory resources.

Program instructions (e.g., computer executable instructions), as described in more detail below, can reside on the various network devices. For example, program instructions in the form of firmware, software, etc., can be resident on the network 100 in the memory of a network management station 112, of the number of "fat" clients 114-1, . . . , 114-N, of the number of "thin" clients 115-1, . . . , 115-M, of one or more routers, 116-1, 116-2, 116-3, and 116-4, hubs and/or switches 118-1, 118-2, 118-3, 118-4, and 118-5, and such program instructions can be executed by the processor(s) thereon. As the reader will appreciate, program instructions can be resident in a number of locations on various network devices in the network 100 as employed in a distributed computing network.

Embodiments within the scope of the present invention include computer-readable media having computer-executable instructions or data fields stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions. Combinations of the above are also be included within the scope of computer-readable media.

Computer-executable instructions include, for example, instructions to cause a general purpose computer, special purpose computer, or special purpose processing device to perform a certain function or group of functions, routines, etc. In some contexts, the computer-executable instructions are described as program modules being executed by processor resources within a computing device. Generally, program modules include routines, programs, objects, data structures, etc. that perform particular tasks. As used herein, a computing device can include PDAs, PC tablets, cellular phones, laptops, desktops, etc.

Figure 2A:
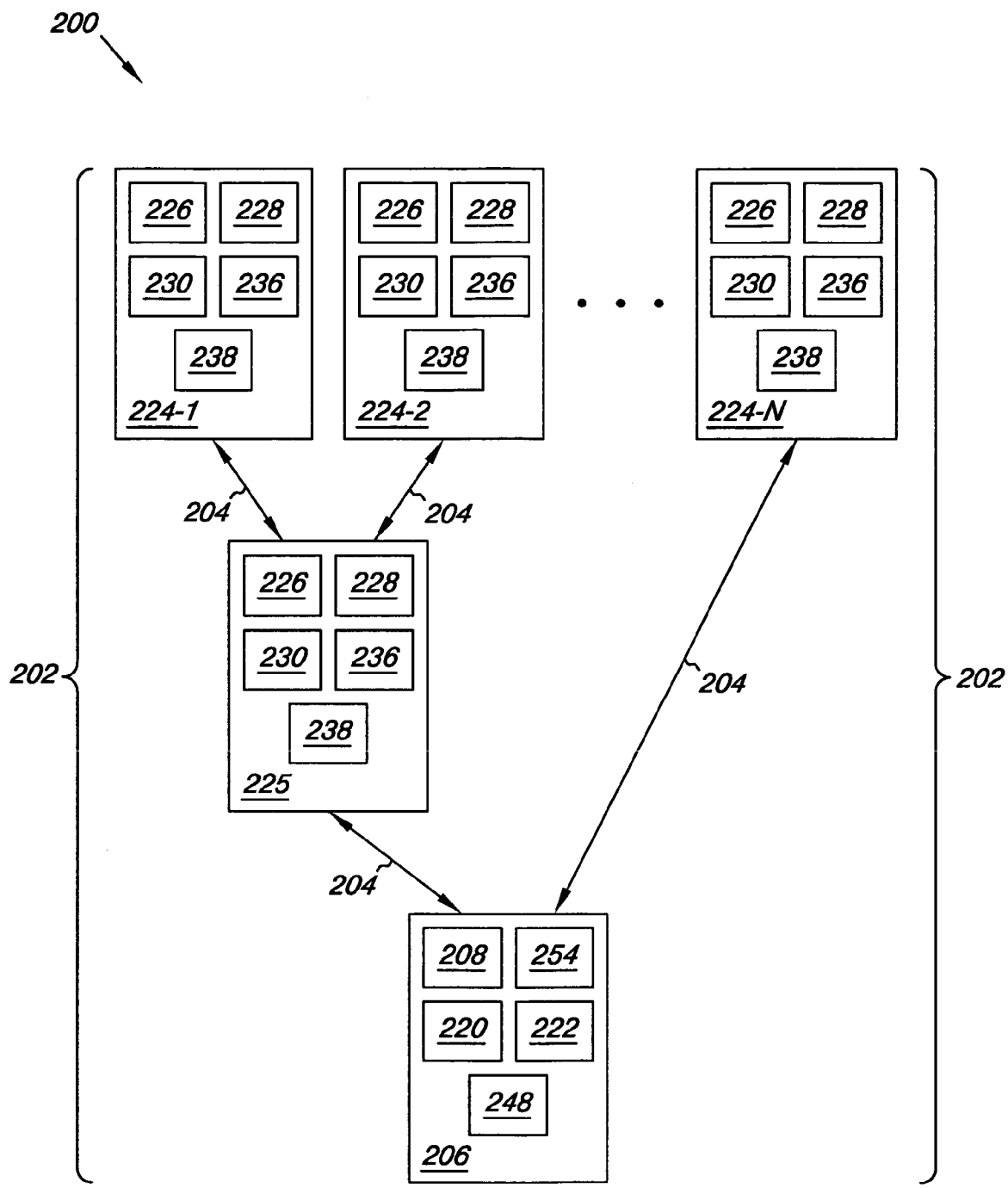
FIG. 2A is a block diagram illustrating a system for handling and/or processing electronic data according to an embodiment of present invention.
Figure 2B:
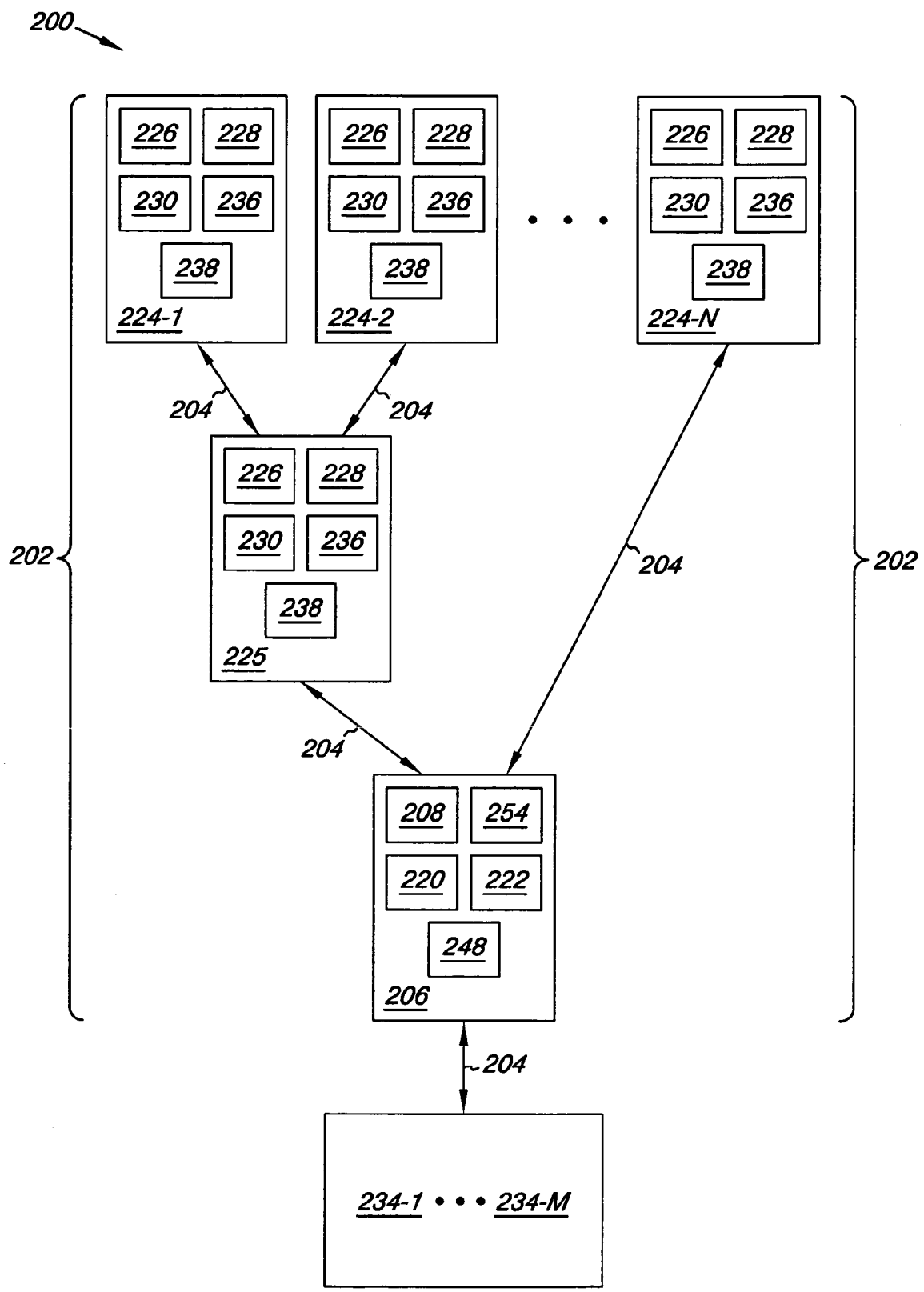
FIG. 2B is a block diagram illustrating a system for handling and/or processing electronic data according to an embodiment of present invention.
Figure 2C:
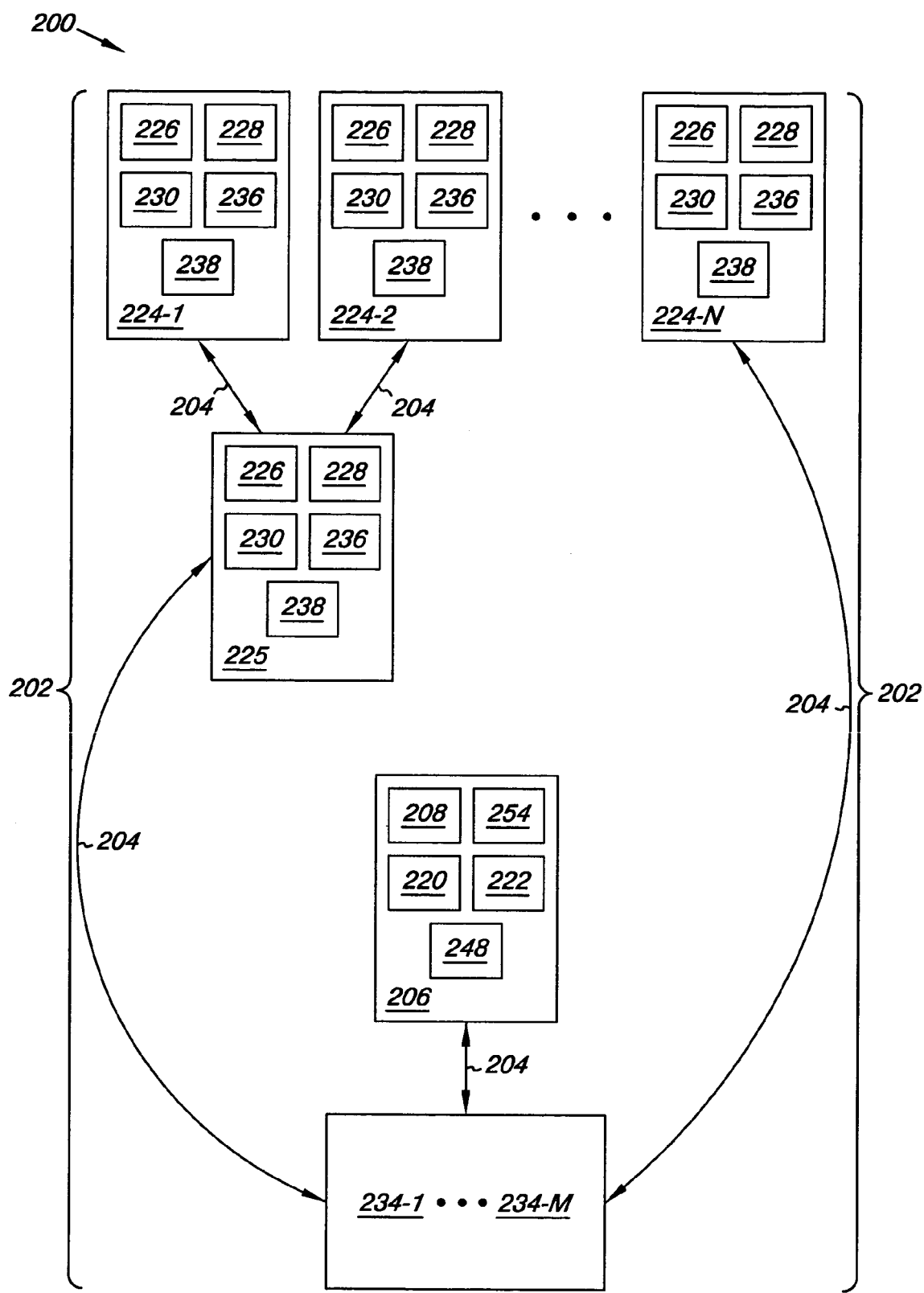
FIG. 2C is a block diagram illustrating a system for handling and/or processing electronic data according to an embodiment of present invention.

FIGS. 2A, 2B and 2C are block diagrams illustrating a number of data collection devices 224-1, 224-2 . . . 224-N and a main data store 225 that can ultimately communicate with a fee determination device 206. The data collection devices 224-1, 224-2 . . . 224-N can include "fat" or "thin" clients as discussed in connection with FIG. 1. Similarly, the main data store 225 can include a network connected PC, or network management station as described in FIG. 1. As the reader will appreciate, the data collection devices 224-1, 224-2 . . . 224-N and the main data store 225 can communicate with the fee determination device 206 over a network 204 such as the network 100 illustrated in FIG. 1. As will be discussed in more detail below, the data collection devices 224-1, 224-2 . . . 224-N and the main data store 225 can communicate with additional servers and systems 234-1 . . . 234-M as may be owned by or proprietary to other third parties. The data collection devices 224-1, 224-2 . . . 224-N and/or the main data store 225 may access the fee determination device 206 and/or the additional servers and systems 234-1 . . . 234-M via a local area network, or may remotely access the fee determination device 206 and/or the additional servers and systems 234-1 . . . 234-M via a virtual private network, remote dial-up, or similar remote access communication mechanism. As provided herein, program instructions are not limited to a program written in any particular language. Nor is the program limited to any particular operating environment. Embodiments of the present invention may be practiced using a variety of data collection devices to interact with the fee determination device 206 and/or the additional servers and systems 234-1 . . . 234-M via a network. The designator "M" is intended to indicate a number of additional servers and/or computing devices can communicate with the fee determination device 206 in a single network or combination of networks, or with the data collection devices 224-1, 224-2 . . . 224-N and/or the main data store 225. The additional servers and systems, 234-1 . . . 234-M, can include proprietary databases, data modules, and software systems maintained by a third party, such as a third party Internet site.

In addition, the reader will further appreciate that data transfer between one or more of the data collection devices 224-1, 224-2 . . . 224-N, the main data store 225, the fee determination device 206 and/or additional servers and systems 234-1 . . . 234-M can occur in other ways. For example, data transfer can take place on computer-readable media, such as hard disks, floppy disks, optical disks, magnetic tape, flash memory card(s), EPROM, and EEPROM. Other computer readable media are also possible. Data transfer can also take place via a wireless personal area network (PAN) such as Bluetooth, or via infrared communication. Hence, it is noted that the data collection devices 224-1, 224-2 . . . 224-N do not have to be physically tethered to a network such as that shown in FIG. 1.

The data collection devices 224-1, 224-2 . . . 224-N and the main data store 225 can include and number of electronic devices. By way of example, and not by way of limitation, the data collection devices 224-1, 224-2 . . . 224-N and the main data store 225 can include a laptop computer, desktop computer, or the like, having the ability to run a web browser. Alternatively, the data collection devices 224-1, 224-2 . . . 224-N and the main data store 225 can include a personal digital assistant (PDA), a web-enabled cellular phone, or similar device, such as those discussed herein.

The data collection devices 224-1, 224-2 . . . 224-N and the main data store 225 can include sensors or instrumentation for recording the occurrence of an event. Examples include, but are not limited to, optical sensors for marking the passing of an object (e.g., a person, animal, or a box) past a predetermined point, sensors for reading a response given on a response medium (e.g., an oval filled-in on a questionnaire), barcode readers for monitoring items containing a barcode. As described in connection with FIG. 1, the network can include a communication network, such as a packet-based digital network like the Internet. In this manner, the embodiments can scale to suit a number of the data collection devices 224-1, 224-2 . . . 224-N and the main data store 225 from a number of sources.

FIGS. 2A, 2B and 2C, illustrate various embodiments 200 of an electronic data handling system 202 to monitor the handling of electronic data for the purpose of determining a fee. The embodiments of FIGS. 2A, 2B and 2C include an electronic computing device to perform the function of an electronic fee determination device 206. The fee determination device 206 performs a valve or gateway function to determine a fee associated with handling electronic data.

As shown in FIGS. 2A, 2B and 2C the fee determination device 206 includes a processor 208 coupled to a memory and/or database, e.g., computer readable medium 220. The fee determination device 206 can, but not necessarily, further include a display 222 and one or more input/output (I/O) devices (not shown) as the same are known and understood by one of ordinary skill in the art, e.g., input devices such as a mouse, keyboard, touch panel. Processor 208, memory 220, and display 222 can include any type of processor, memory, and display capability in the art of computing.

As shown in the embodiment of FIGS. 2A, 2B and 2C, the fee determination device 206 can be connected to a number of additional electronic devices, such as the data collection devices 224-1, 224-2 . . . 224-N and the main data store 225. The designator "N" indicates that a number of data collection devices (e.g., 224-3, 224-4 . . . 224-N) can be connected 204 to the fee determination device 206 over a network, via disk, etc. The data collection devices 224-1, 224-2 . . . 224-N and the main data store 225 can similarly each include processor 226, memory 228, and display 230 capabilities, as well as I/O devices.

According to embodiments of the present invention, the fee determination device 206, the data collection devices 224-1, 224-2 . . . 224-N and the main data store 225 in network 204 can include program instructions for handling and/or processing electronic data. As noted above, FIGS. 2A, 2B and 2C illustrate various embodiments for handling and/or processing electronic data in order to determine a fee in association with doing so according to a selectable metric. Regardless of the manner for handling and/or processing electronic data, the data collection devices 224-1, 224-2 . . . 224-N and/or the main data store 225 include program instructions with can execute to receive data in an unencrypted form, and/or unlocked form (hereinafter referred to as unencrypted for ease of reference). For example, the data collection devices 224-1, 224-2 . . . 224-N include program instructions which can execute to receive and/or record responses to questions (e.g., a "yes" or a "no" response), such as those in a questionnaire or a test. As used herein, data in an unencrypted (or "unlocked") form includes plain text (also known as "clear text"), such as textual data in ASCII format. In additional embodiments, data in an unencrypted form can include data suitable for use with spreadsheet and/or statistical analysis programs such as those using the trade names SPSS and/or Excel. The data collection devices 224-1, 224-2 . . . 224-N and/or the main data store 225 can additionally include program instructions which can execute to construct, layout, compose, and/or produce questionnaires, tests, code development, passive measurement studies, quality control studies, reactive measure surveys (including open and closed ended questions, as the same will be known and understood by one of ordinary skill in the art), real-time and delayed ratings studies, map-based people tracking, EyesOn® viewer attention and EarsOn℠ listener attention measurements, etc.

Thus, by way of example and not by way of limitation, examples of responses receivable by the data collection devices 224-1, 224-2 . . . 224-N and/or the main data store 225 include, but are not limited to, answers to closed ended questions (e.g., definite answer with limited response options—"yes" or "no"); answers to open ended questions (e.g., requiring specific details to be provided); observational information including behavioral observations and animal behavior response information; video analysis information; observation ratings of attention or other behaviors (from live viewing or from video recordings of the behaviors); content ratings of text such as verbatim replies of people to open-ended questions that can be coded for the presence/absence or strength of a set of elements or attributes in the text; other forms of content coded material such as coding of the content of audio tapes, text in articles, essays, stories and/or books; and vocalizations of non-humans; descriptive ratings of behaviors, verbalizations or events; computer-generated logs of computer-user behavior, including time-stamps and event descriptions (sites visited, keys hit, scroll parameters, programs called, etc.); and other responses as are, or will be, known and understood by those of ordinary skill in the art.

In addition, as will be appreciated additional data can be "collected" without input from a user based upon the user's response to the questions. For example, the data collection devices 224-1, 224-2 . . . 224-N and/or the main data store 225 can include executable programs to pre-process and/or post-process additional data based on the received data. Examples include, but are not limited to, deriving additional data based on responses to question posed to the user (e.g., questions include how may sons and/or daughters you have, which allows for processing the additional data point of the total number of children the person responding to the questions has). Program instructions within the data collection devices 224-1, 224-2 . . . 224-N and/or the main data store 225 can then convert the received data in the unencrypted form into an encrypted or "locked" (hereinafter referred to as "encrypted") form.

To achieve the same, the data collection devices 224-1, 224-2 . . . 224-N can include a data manager 236 program module, e.g., program instructions, which executes to receive the data in the unencrypted form and an encryption manager 238 program module executes to encrypt and/or "lock" the received data.

As will be appreciated, encryption and/or locking of the received data can be accomplished according to a number of methods. For example, various embodiments can utilize either asymmetric encryption and/or symmetric encryption methods. By way of example and not by way of limitation, data received within the data collection devices 224-1, 224-2 . . . 224-N and/or the main data store 225 can be encrypted by the encryption manager 238 with a public key utilized by the fee determination device 206. Encryption of received data can occur on a per received data basis and/or on a group of two or more of the received data. According to the various embodiments, the per received data basis is defined by a selectable metric which treats various codes, fields, studies, records, subjects, etc. differently, e.g. open ended questions are handled differently from closed ended questions. The public key (asymmetric) and/or common key (symmetric) can be contained within the encryption manager 238 of data collection devices 224-1, 224-2 . . . 224-N and/or the main data store 225 to encrypt the received data. The private key (asymmetric) and/or common key (symmetric) to decrypt the received data can be controlled by the fee determination device 206. As will be appreciated, more than one encryption key can be used with the received data. So, an encryption key could be specific for one piece of data, or to an entire collection of data received by one or more of the data collection devices 224-1, 224-2 . . . 224-N and/or the main data store 225. In this manner the user is only paying for a volume and/or type of data decrypted, as discussed herein. Embodiments, however, are not limited to these example encryption and decryption methods. One of ordinary skill in the art will appreciate the manner in which the received data may be "locked" or encrypted to restrict access to the received data, as will be described in more detail below, in order to determine a fee according to a selectable metric in association with handling the data and/or to perform additional processing on the data.

In various embodiments, the received data can be transferred between one or more of the data collection devices 224-1, 224-2 . . . 224-N and the main data store 225. In this way, the main data store 225 can act as a central repository for data received by the data collection devices 224-1, 224-2 . . . 224-N. It is noted that, among various embodiments, the received data is not required to ever leave the one or more of the data collection devices 224-1, 224-2 . . . 224-N and/or the main data store 225. That is, according to various embodiments the received data may be maintained within the data collection devices 224-1, 224-2 . . . 224-N and/or the main data store 225, where it has been encrypted, at all times.

By encrypting the received data, the program instructions on the data collection devices 224-1, 224-2 . . . 224-N and/or the main data store 225 execute to maintain the received data in such a way that a user is provide no electronic ability to aggregate data received from different studies, records, subjects, etc. In other words, the user cannot electronically employ software to analyze between and/or electronically aggregate results of different studies, records, subjects, etc. As used herein, aggregation of, or aggregating, the decrypted data can include processes in which the decrypted data is gathered and expressed in a summary form for further processing. A common aggregation purpose is to get more information about a particular group compiled from the individual data sets based on specific variables (e.g., age, profession, or income). For example, statistical analysis programs in various forms, as the same will be known by one skilled in the art, can be performed on the decrypted data once aggregated.

In some embodiments, by encrypting the received data the program instructions on the data collection devices 224-1, 224-2 . . . 224-N and/or the main data store 225 execute to maintain the received data in such a way as to allow a user to electronically employ software to analyze between and/or electronically aggregate results of only a limited amount of the received data, e.g., a limited number of studies, records, subjects, etc., (e.g., perhaps two or three) without going through the fee determination device 206. To achieve this, for example, program instructions on the data manager 236 can execute to maintain the received data in encrypted form that allows access to only a limited amount of the received data in an aggregated form. In some embodiments, the encryption manager 238 executes the instructions to prevent the aggregation or analysis of the received data (i.e., the encryption manager 238 maintains the encrypted data in a non-aggregated state). According to various embodiments, limited access is provided, for example, to allow a user to view, revise, edit, print and/or delete the encrypted data in the non-aggregated form on the data collection devices 224-1, 224-2 . . . 224-N or with peripheral devices attached to the data collection devices. However, this ability to manipulate the received data, however, can be limited to performing these functions on, for example, only one piece of received data at a time. Again, embodiments prevent the user from aggregating and/or analyzing the received data in its encrypted form (i.e., encrypting the data prevents aggregation or analysis of the data) prior to processing or handling the data through the use of the fee determination device 206.

In the embodiment of FIG. 2A, the data collection devices 224-1, 224-2 . . . 224-N and/or the main data store 225 execute instructions to request decryption tools, as described above, from the fee determination device 206. Upon receipt of such tools the data collection devices 224-1, 224-2 . . . 224-N and/or the main data store 225 can execute additional software to analyze between and/or electronically aggregate results of the received data. In this manner, the data will not have to go outside the privacy of the data collection devices 224-1, 224-2 . . . 224-N and/or the main data store 225. The fee determination device 206 will execute instructions to determine a fee based on the selectable metric and the tools returned to the data collection devices 224-1, 224-2 . . . 224-N and/or the main data store 225. As a result, concerns about data privacy (e.g., control over the received data) can be minimized as only the one or more decryption keys are transmitted.

According to embodiments of the present invention, program instructions are provided to the fee determination device 206 that can execute to determine a fee to charge for handling the data based on a selectable metric. For example, a fee manager 254 executing on the fee determination device 206 can record a volume of data decrypted and/or a type of data decrypted, (e.g., decryption of different types of data can have different fees associated therewith (hereafter referred to as "selectable metric business rules"). The volume and/or type of data decrypted can then be used in determining a fee to charge for handling the non-aggregated data.

The program instructions execute based on the selectable metric business rules such that as encrypted data is decrypted or decryption tools are provided to another device such as the data collection devices 224-1, 224-2 . . . 224-N and/or the main data store 225, the fee is determined. The selectable metric business rules can be applied, and/or combined according to a volume and type of bytes processed, how many encryption keys used, processor usage, number of surveys processed, a bandwidth traffic utilized to transfer data, informational content processed, a volume of memory accessed, field types utilized, and analyst codes utilized. As will be appreciated, other metrics for tracking a volume and a type of data handled in order to determine a fee are also possible.

With respect to payment of the fees, one embodiment of the present invention provides that the fee determination device 206 includes programs that execute to transmit the decrypted data and/or the decryption tools (e.g., decryption keys) over the connection upon electronic receipt of the fee, thereby allowing access to the encrypted data.

One example fee determination scenario, which can be implemented according to the various embodiments described herein, include the following. The data collection devices 224-1, 224-2 . . . 224-N and/or the main data store 225 can be provided with software, e.g., program instructions which can execute to construct, layout, compose, and/or produce questionnaires, tests, code development, passive measurement studies, quality control studies, reactive measure surveys (including open and closed ended questions, as the same will be known and understood by one of ordinary skill in the art), real-time and delayed ratings studies, map-based people tracking, eyes-on viewer attention and ears-on listener attention measurements, etc., for free and a user can subscribe to a service provided by the data determination device for a relatively small fee to set up an account, e.g., $10/yr. As the fee determination device is employed to decrypt or provide tools to decrypt data, a user will be billed by volume according to the selectable metric.

For example, a user may be billed ⅕ of a penny (US currency) per field of data generated (e.g., fields can be delineated by commas). In this example, 100 fields per study, record, subject, etc., would total 20 cents. Moreover, 40 questions, e.g., 40 fields, with 2 open ends (10 codes per open end), e.g., 20 fields, and 30 behavioral sample frames, e.g., 30 fields, would total 90 fields costing the user 18 cents. As another example, a survey of 40 closed end questions on 50 people, e.g., studies, records, subjects, etc., (2000 fields) would cost $4.00. By comparison, a survey of 200 studies, records, subjects, etc., with 50 closed ended questions would cost $20.00. Embodiments, however, are not limited to these examples.

The embodiment of FIG. 2A can also allow for the encrypted data to be transmitted to the fee determination device 206. In such embodiments, program instructions on the fee determination device 206 execute to decrypt the encrypted data from its encrypted form. In these embodiments, the fee determination device 206 can then return the decrypted data to the data collection devices 224-1, 224-2 . . . 224-N and/or the main data store 225 to be operated on by other software analysis tools and/or to be electronically aggregated thereon. Alternatively still, the fee determination device 206 may employ the additional software analysis tools and/or perform the electronic aggregation before returning the results to the data collection devices 224-1, 224-2 . . . 224-N and/or the main data store 225. Likewise, as discussed more below in connection with FIGS. 2B and 2C, the fee determination device 206 may transmit decrypted data to other third party systems, servers, and computing devices, e.g., 234-1, . . . , 234-M, to have their additional software analysis tools operate on and/or perform the electronic aggregation before returning the results to the data collection devices 224-1, 224-2 . . . 224-N and/or the main data store 225.

One of ordinary skill in the art will appreciate upon reading this disclosure that transferring tools to the data collection devices 224-1, 224-2 . . . 224-N and/or the main data store 225 can include encryption keys transferred via disk and/or on a smart card. For example, a smart card, EEPROM, and/or flash memory device could be enabled by the fee determination device to facilitate decryption according to the selectable metric on the data collection devices 224-1, 224-2 . . . 224-N and/or the main data store 225. In such embodiments, a user could purchase a physical card, e.g., a solid state card, or other secure physical, limited write key-device, that would permit the user to decrypt a specified volume of data for electronic aggregation or other software analysis. In these embodiments, a user will be even further un-tethered from having to exchange signal requests to the fee determination device directly. One of ordinary skill in the art will appreciate upon reading this disclosure the manner in which such a physical card could be replenished and charge a fee direct to a user's account, e.g. in a similar fashion to a debit card, phone card, credit card, and/or EZ pass, etc.

FIG. 2B illustrates another embodiment in which the fee determination device 206 can interact with additional software functionality, e.g., software analysis tools, and/or electronic aggregation tools, provided on other systems, servers and/or computing devices, 234-1 . . . 234-M, e.g., third party, proprietary systems. That is the other systems, servers and/or computing devices, 234-1 . . . 234-M can include software to electronically analyze between and/or electronically aggregate results of studies, records, subjects, etc. In these embodiments the received data is brokered by the fee determination 206. Hence, in various embodiments the fee determination device can forward decrypted data to the other systems, servers and/or computing devices, 234-1 . . . 234-M to be operated thereon. In alternative embodiments, the received data can be maintained and decrypted on the fee determination device 206 and the third party software functionality, e.g., software analysis tools, and/or electronic aggregation tools, can be retrieved from the additional servers and/or computing devices, 234-1 . . . 234-M and employed on the fee determination device 206 or transmitted to the data collection devices 224-1, 224-2 . . . 224-N and/or the main data store 225 to be employed thereon. And, in various embodiments, the received data can be maintained and decrypted on the data collection devices 224-1, 224-2 . . . 224-N and/or the main data store 225 with the fee determination device 206 determining a fee for handling the received data based on the decryption tools and/or additional software tools brokered to the data collection devices 224-1, 224-2 . . . 224-N and/or the main data store 225 according to the selectable metric.

As the reader will appreciate, in the embodiments illustrated by FIG. 2B, users of the data collection devices 224-1, 224-2 . . . 224-N and/or the main data store 225 may only see or know they are interacting with the fee determination device 206. The relationship of the additional servers and/or computing devices, 234-1 . . . 234-M may be strictly with the fee determination device 206 and the relationship between the fee determination device 206 and the additional servers and/or computing devices, 234-1 . . . 234-M may be entirely transparent to the user's of the data collection devices 224-1, 224-2 . . . 224-N and/or the main data store 225

As discussed, the present embodiments allow for the decryption of the received data to occur on any one or more of the data collection devices 224-1, 224-2 . . . 224-N, the fee determination device 206, the main data store 225, and/or additional servers and systems 234-1 . . . 234-M. To provide just one example, the non-aggregated data in encrypted form can be transmitted from one or more of the date collection devices 224-1, 224-2 . . . 224-N and/or the main data store 225 to the fee determination device 206. Once received, program instructions on the fee determination device 206 can execute to decrypt the received encrypted data. A decryption manager executing on the fee determination device 206 receives the encrypted data and executes program instructions to decrypt the non-aggregated data. The decrypted data can then be transmitted via network connection, disk or other media form from the fee determination device 206 to any one of the data collection devices 224-1, 224-2 . . . 224-N, the main data store 225, and/or the additional servers and systems 234-1 . . . 234-M.

FIG. 2C illustrates an example wherein user's of the data collection devices 224-1, 224-2 . . . 224-N, the main data store 225 may only see or know they are interacting with the additional servers and/or computing devices, 234-1 . . . 234-M. Again, in this example, the additional servers and/or computing devices, 234-1 . . . 234-M possess a relationship with the fee determination device 206. However, in these embodiments, the relationship between the fee determination device 206 and the additional systems, servers and/or computing devices, 234-1 . . . 234-M may be transparent to the user's of the data collection devices 224-1, 224-2 . . . 224-N, the main data store 225.

In one example embodiment, the non-aggregated data in encrypted form can be transmitted from one or more of the data collected devices 224-1, 224-2 . . . 224-N and/or the main data store 225 to the additional servers and systems 234-1 . . . 234-M. Once received, the additional systems, servers and/or computing devices, 234-1 . . . 234-M can request the tools to decrypt the received data and program instructions on the fee determination device 206 can process the keys or tools requested and determine a fee for doing so according to the embodiments described herein.

Alternatively, the third party systems, servers and/or computing devices, 234-1 . . . 234-M can transmit the non-aggregated data in encrypted form to the fee determination device 206 for decryption and fee determination. The fee determination device would then return the decrypted data to the third party systems, servers and/or computing devices, 234-1 . . . 234-M, for further data processing. Again, decrypted data can be transmitted via network connection, disk or other media form from the fee determination device 206 to any one of the date collection devices 224-1, 224-2 . . . 224-N and/or the main data store 225 via the additional servers and systems 234-1 . . . 234-M. In one embodiment, the decrypted data can be transmitted from the fee determination device 206 and/or the additional servers and systems 234-1 . . . 234-M in an ASCII format. In an alternative embodiment, the decrypted data can be transmitted from the data processing device 206 and/or the additional servers and systems 234-1 . . . 234-M in a format compatible for use with spreadsheet and/or statistical analysis programs such as those using the trade names SPSS and/or Excel. Other data formats are also possible.

In another embodiment, the non-aggregated data in encrypted form would be maintained on the data collection devices 224-1, 224-2 . . . 224-N and/or the main data store 225. In this example, the data collection devices 224-1, 224-2 . . . 224-N and/or the main data store 225 would request the additional software functionality from the third party systems, servers and/or computing devices, 234-1 . . . 234-M to operate on particular non-aggregated data in encrypted form. The third party systems, servers and/or computing devices, 234-1 . . . 234-M would request the tools to decrypt the data needed to be operated on and program instructions on the fee determination device 206 would return the keys or tools requested and determine a fee for doing so according to the embodiments described herein. The third party systems, servers and/or computing devices, 234-1 . . . 234-M could then provide the keys or tools to decrypt the data to the data collection devices 224-1, 224-2 . . . 224-N and/or the main data store 225 to decrypt the received data thereon. The third party systems, servers and/or computing devices, 234-1 . . . 234-M would additionally provide to the data collection devices 224-1, 224-2 . . . 224-N and/or the main data store 225 the additional software functionality requested.

As the reader will appreciate, program embodiments and architectures have been described such that a selectable metric can be applied to the handling of electronic data. The embodiments described herein provide for determining a fee by volume and type of received data handled. The selectable metric is implemented such that a user is afforded a reliable fee model. The embodiments thus do not require a large up front fee from a user. The embodiments similarly do not require that a user be tethered to the web or a network to collect data and/or analyze received data. Further, the privacy of the data may be maintained by the user. Additionally, as will be seen more below, a user may be provided with certain software functionality for free, with unlimited copying rights.

Figure 3:
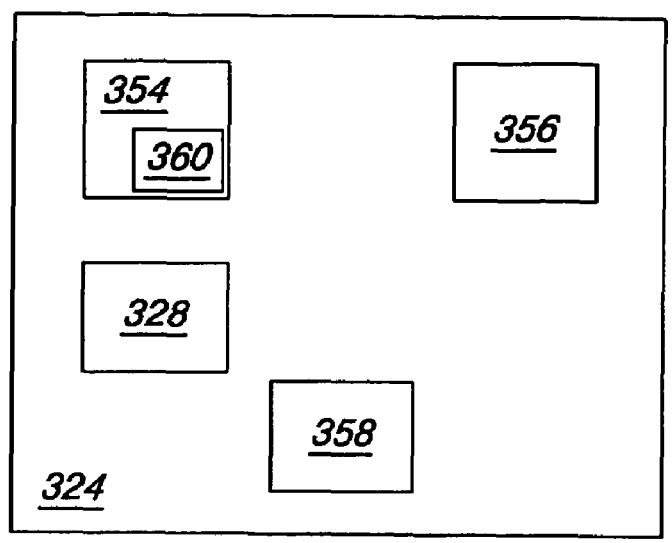
FIG. 3 illustrates an embodiment for an electronic device and computer readable medium for use in a computing device network according to an embodiment of present invention.

FIG. 3 is a block diagram illustrating an embodiment of a data collection device 324 and computer readable medium for use in a computing device network, as discussed above. As shown in the embodiment of FIG. 3, the data collection device 324 can include software tools for data collection and analysis, as discussed herein. For example, the software tools can include modules tailored for developing forms to acquire/receive data that can be encrypted, as provided herein. These developed forms can be used in, besides other things, research studies involving questioning, interview studies, behavioral observations, video recording, or computer monitoring.

In FIG. 3, the data collection device 324, as discussed above, provides an operating environment for execution of a data gathering module 354, a decryption module 356, and an analysis module 358. As discussed herein, these software modules can include programs that can operate to provide tools for designing studies, building forms, collecting response information (i.e., data), coding verbal content and behavior, tabulating results, creating tables and charts, exporting the data to other programs, and performing grounded-theory analysis of the findings. Regardless of its implementation, however, the data collection device 324 maintains control over the ability to aggregate and analyze the gathered response information by encrypting the data, as discussed herein. To make the response information available for aggregation and analysis, it needs to be decrypted through use, for example, of the fee determination device, as discussed herein.

In one embodiment, the data gathering module 354 includes one or more programs that can operate to allow the creation of data acquisition modules 360. The data acquisition modules 360 can take a variety of forms, such as questionnaires, that allow for response information to be received and encrypted according to the present embodiments. For example, the data gathering module 354 include the data acquisition modules 360 that allow a user to design and configure a template for collecting response information. In one embodiment, the template may comprise one or more multi-dimensional structures that provide an interface for entering and acquiring response information. For example, templates can be used to create questionnaires, tests and observational forms, among others as will be discussed herein. These forms can be printed on paper or administered via one or more electronic devices (e.g., computer, handheld, tablet PC or palm devices). The data gathering module 354 can store the data acquisition modules 360, as well as the corresponding templates, within memory 328.

In one embodiment, templates can allow for the use of a "drag and drop" feature for designing and/or creating questionnaires, tests and observational forms to be used in collecting response information. In addition, option menus can be available for additional question research features like skip-patterns, content-piping (where the answer to one question can be inserted into the text of another question), question rotation, time-sampling, and answer-validation.

The templates can also allow for video capture programs that can be used in conducting tests of audience reaction to audio and/or visual materials (TV, video, film or web), still images, and websites using methodologies which can incorporate both questioning and video recording of audience behavior. The templates can also allow for data to be gathered on people's movements and behaviors in pre mapped spaces. Examples of the aforementioned software tools include modules for tests of video materials that generate moment-by moment reaction data (i.e., observations of attention, reaction, and/or keypad entries made by viewers). Video analysis programs can then be executed to analyze the reaction data. In addition, response information in the form of the raw video data of the recorded behavior can also be acquired and encrypted according to the embodiments of the present invention. Encrypting the video data (either raw data and/or reaction data) in this manner then require the response information to be decrypted and aggregated so as to make the recorded images accessible to the user for analysis.

As will be appreciated, each of the different types of response information collected (e.g., video, responses to open and/or closed ended questions) can have a different set of properties which, in most cases, requires a different kind of file structure to be used. Examples of the different types of response information collected can include, but is not limited to, a single data measure having one score per case (e.g., an answer to a closed ended question), repeated data measures made at fixed intervals (e.g., fixed set of stimulus units in fixed sequence, single dependent index, fixed number of scores per case), repeated data measures made at variable intervals (e.g., variable stimulus units (from a definable set), single dependent variable (time), variable number of scores per case), repeated measures of location made at fixed intervals. Regardless of the properties, however, encrypting the response information through programs executed in the data gathering module 354 remains platform independent.

In an additional embodiment, the decryption module 356 can include programs which operate on the encrypted data of the response information so as to provide decrypted data according to the embodiments of the present invention. As discussed herein, decryption of data for the response information can occur in a number of locations. For example, decryption can occur on the fee determination device upon receiving the encrypted data. In an alternative embodiment, decryption can occur on the data collection device upon receipt of the required decryption information from the fee determination device.

Regardless of where the decryption occurs, however, determining the fee for the decryption process can be based on the user selectable metric, as discussed herein. Examples of the response information can include a survey format with open and closed ended questions. In this example, the fee to charge can be determined based on a number count of open ended questions and closed ended questions processed. The format of the response information can also include a particular application language suited to a particular operating environment. For example, a particular application language can include the video capture program discussed herein, where decrypting the response information includes facilitating access to the received response information to a different application operable on the particular application language suited to the particular operating system environment. In an alternative embodiment, the format of the response information can include behavioral observations, such as animal behavior response information. In one embodiment, the fee for processing behavior observations can be determined based on a bandwidth traffic (e.g., a video bandwidth traffic) to the received response information.

Other software tool modules useful with the embodiments of the present invention include those that provide for analysis of open-ended questions. These modules can provide analytical tools for developing content codes to use for the analysis of people's verbatim responses to open-ended questions; for conducting content analysis using those codes, and for automatically counting word-use frequencies.

The analysis module 358 includes programs that operate on the decrypted data to provide processing and analysis of the decrypted data. For example, the analysis modules can allow for the creation of tables, cross-tabs and charts from the decrypted data. In particular, the analysis module 358 comprises software routines for implementing video data analysis processing for creating charts, for example, to plot response levels against time, to be overlaid upon a content outline of the stimulus, and/or to generate a video-chart in which response levels are plotted as a moving bar, recorded as a digital video, and ready to be superimposed upon the video of what the audience had been watching.

The analysis module 358 can also include analytical software modules that can execute to generate analysis reports based on the decrypted data. In particular, the analytical software modules allow a user to formulate complex queries for generating reports and performing other data analysis functions on the decrypted data. Example of various types of analysis reports that can be generated by the analysis module 358 include, but are not limited to, statistical analysis, relational modeling, entity-relationship modeling, online analytical reporting (OLAP), multidimensional OLAP (MOLAP), relational OLAP (ROLAP), hybrid OLAP (HOLAP), and data mining. As with the other modules discussed herein, these software modules may be web-based modules having a browser interface, or may be stand-alone executable programs.

Software modules useful with the embodiments of the present embodiments, however, are not limited to acquiring and processing social or behavioral research data. In contrast, embodiments of the present invention can be useful for processes where people use software to collect data and then need to aggregate and analyze that data. Examples of other areas where the embodiments of the present invention may be useful include inventory management (e.g., through the use of bar-codes), classroom evaluation, educational testing, household & business services, traffic engineering, medical labs, and engineering labs. One skilled in the art will appreciate other areas in which the embodiments of the present invention may be useful.

As will be appreciated, embodiments of the present invention may be of benefit to any number of individuals and/or entities, such as: those in marketing, education, politics, publishing, public relations, architecture, city planning, transportation and communications, advertising, video production, graphics design, web development, consumer product design, entertainment, musicians; those who would like to test prototypes, test the competition or conduct small surveys to help them get backing, define their targets, generate new ideas or refine their product; specialty product manufacturers with limited lines who would like to explore new markets, line extensions, and new products; small media companies such as local radio stations, newspapers, cable TV channels or websites, who would like to do surveys of current and potential audiences for targeting, sales promotion, editorial feedback or to test the possibilities for new programs or publications; small retail and service business establishments and chains seeking feedback from their customers on their current offerings and services, new concepts or the competition; schools and school systems which give tests to students, conduct surveys of staff or parents, make regular, systematic observations of classrooms and teacher performance; non-profit organizations and foundations, including volunteer-run services, which could use research to establish needs, identify opportunities or assess effectiveness; museums, zoos, parks, historical sites, cultural centers; local, regional or state government offices which provide, develop or monitor social, educational, financial or transportation services; professors at colleges and universities in social and behavioral sciences, biology, economics, politics, public health and business; students doing research projects for classes or theses in any of the above fields; research centers or institutes associated with an academic institution; companies with temporarily overloaded research departments; forms for sports and/or coaching such as templates for evaluating a player(s) and/or review of a game(s).

Figure 4:
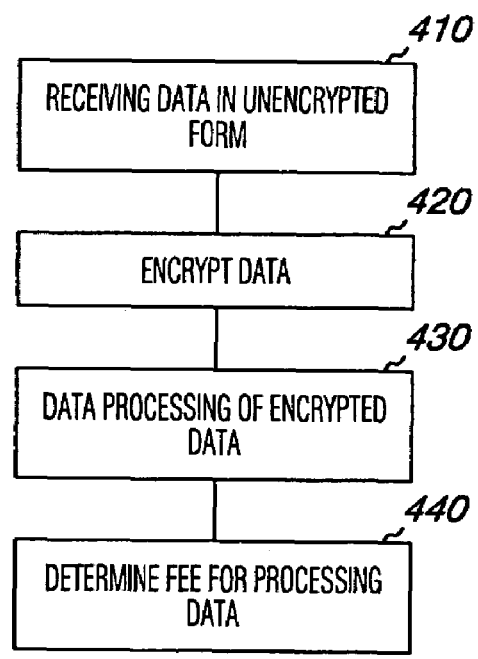
FIG. 4 is a flow chart diagram illustrating a method embodiment.

FIG. 4 illustrates an embodiment of a method for handling electronic data. As illustrated in FIG. 4, the method includes receiving data in an unencrypted form in block 410. For example, receiving the data in an unencrypted form can occur through the use of the data collection device, as discussed herein.

The method further includes block 420 in which the data in the unencrypted form can be encrypted. As discussed herein, encryption of the data can take place in the data collection device. Acquiring the encrypted data in the data collection device(s) prevents the aggregation and/or the analysis of the data without first being decrypted according to the present embodiments.

At this point, the encrypted data can be received for further processing in either the data collection device(s) and/or the data processing device at block 430. So, for example, further processing of the encrypted data can occur by transmitting some or all of the encrypted data from the data collection device to the fee determination device. The encrypted data received by the fee determination device, in a non-aggregated form, can then be decrypted, as discussed herein. Further processing of the decrypted data can include aggregation and/or statistical analysis of the decrypted data, as provided herein. The decrypted data can then be transmitted from the fee determination device to the data collection device(s) in a number of different formats, as discussed herein.

In an alternative embodiment, further data processing at block 430 can include receiving a request to decrypt the data by the fee determination device. In one embodiment, this request can be transmitted from the data collection device(s), which maintains control over the received encrypted data. Decryption information (e.g., decryption key(s)) can then be transmitted from the fee determination device to the data collection device(s). Decryption of the data can then take place on the data collection device using the decryption information. Further processing of the decrypted data can then include aggregation and/or statistical analysis of the decrypted data, as provided herein.

At block 440, a fee to charge for handling the data is determined based on the amount of data decrypted. In one embodiment, the fee for processing the data can be determined based at least on the application of a selectable metric, as provided herein.

As will be appreciated, various types of data can be processed according to the embodiments of the present invention. For example, response information provides one example of a suitable data type that can be received and handled according to the embodiments of the present invention. Response information can include answers to closed ended questions, answers to open ended questions, observational information including behavioral observations and animal behavior response information, video analysis information, analysis coding (e.g., subjects mentioning of products, subject answers to implied questions, subjects identification of key characters, subject identification of primary communication point, etc.) along with the types of data provided herein.

Regardless of the type of response information recorded, however, the handling of the electronic data according to the present embodiments can be done in an agnostic fashion. That is to say, the method of handling electronic response information includes receiving the response information in an encrypted form in a device (e.g., a laptop computer, a PDA, etc.) that is platform independent to the format of the response information. This approach allows the implementation of the methods described herein (e.g., decrypting the response information, and determining a fee to charge for decrypting the response information based on a selectable metric) without necessarily being constrained to any limitations and/or requirements of the system platform.

In one embodiment, the ability to receive the response information into the device (e.g., the data collection device) in which the platform is independent of the format of the response information can be attributed to a decryption module, discussed more detail herein, that executes to monitor and record the decryption of encrypted data according to the present embodiments. In other words, the decryption module allows for the volume of data being processed according to the present embodiments regardless of the platform environment. In this way, fees can be determined based on a per volume usage (i.e., the volume of data decrypted) that is requested, regardless of the actual platform/application making the request. This approach provided herein provides a user wishing to use the decryption module greater flexibility in design, distribution, execution, and analysis using the metering system described in the embodiments herein.

The present embodiments may also be useful in, for example, inventory management systems for warehousing or sales or distribution, customer relationship management, accounting software, energy management, personnel records, and contact management. Other areas of application for the embodiments of the present invention are also possible.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of handling electronic data, comprising:
  receiving non-aggregated data into a number of different records off-line on a data collection device;
  locking the data on the data collection device so that individual records are still repeatedly operable upon, including being readable and editable, but cannot be operated upon by analysis software to aggregate and analyze the data between different records without being unlocked;

selecting data to be unlocked;

determining a fee for handling the data based on a user controlled selection of a volume and a type of the selected data;

receiving a number of keys to unlock the volume and the type of selected data, such that analysis software can operate on the different records to aggregate and analyze unlocked data between different records;

unlocking data associated with the received number of keys; and executing analysis software that is not tied to and is not specifically compiled and associated with the selected and the unlocked data to analyze between and electronically aggregate results of the unlocked data between different records.

2. The method of claim 1, wherein the method includes allowing the locked data in a non-aggregated form to be revised or deleted on the data collection device.

3. The method of claim 1, wherein operation by analysis software includes performing statistical analysis on the unlocked data.

4. A method of processing electronic data, comprising:

collecting unlocked data into a number of different records on a data collection device;

locking the data on the data collection device so that individual records are still repeatedly operable upon, including readable and editable, but cannot be operated upon by analysis software to aggregate and analyze the data between different records;

selecting data to be unlocked;

determining a fee to charge for unlocking the data based on a user controlled selection of a volume and a type of data to be unlocked;

receiving a number of keys to unlock the volume and the type of selected data such that analysis software can operate on the different records to aggregate and analyze unlocked data between different records;

unlocking the data associated with the received number of keys; and executing analysis software that is not tied to and is not specifically compiled and associated with the selected and the unlocked data to analyze between and electronically aggregate results of the unlocked data between different records.

5. The method of claim 4, wherein unlocking the data includes:

receiving a request to unlock the data by a fee determination device;

transmitting the particular key from the fee determination device to the data collection device; and unlocking the data using the particular key.

6. The method of claim 4, wherein the method includes applying bytes unlocked as a volume to determine the fee to charge for unlocking the data.

7. The method of claim 4 wherein the method includes using a volume of data from the group of a number of surveys unlocked, informational content unlocked, and a volume of memory unlocked to determine the fee to charge for unlocking the data.

8. A method of handling electronic response information, comprising:

collecting response information into a number of different records on a data collection device;

locking the response information in a form that is platform independent to a format of the response information so that individual records are still operable upon, including readable and editable, but cannot be operated upon by analysis software to aggregate and analyze the response information in such a way that combines the response information from different records;

selecting response information to be unlocked;

determining a fee to charge for unlocking the response information based on a user controlled selection of a volume and a type of selected response information to unlock;

receiving a number of keys to unlock the volume and the type of selected response information such that analysis software can operate on the different records to aggregate and analyze unlocked response information between different records;

unlocking the response information associated with the received number of keys; and executing analysis software that is not tied to and is not specifically compiled and associated with the selected and the unlocked response information to analyze between and electronically aggregate results of the unlocked response information between different records.

9. The method of claim 8, wherein the format includes a survey format with open and closed ended questions.

10. The method of claim 9, the method including determining the fee to charge based on a number count of open ended questions responses and closed ended questions responses unlocked.

11. The method of claim 8, wherein the format includes a particular application language suited to a particular operating environment.

12. The method of claim 11, wherein the particular application language includes a video capture program.

13. The method of claim 11, wherein unlocking the response information includes facilitating access to the received response information to a different application operable on the particular application language suited to the particular operating system environment.

14. The method of claim 8, wherein the format includes behavioural observations.

15. The method of claim 14, wherein the behavioural observations are captured by a video capture program.

16. The method of claim 8, wherein the response information includes animal behaviour response information.

17. The method of claim 8, wherein determining a fee includes determining a bandwidth traffic to the received response information.

18. The method of claim 17, wherein the bandwidth traffic includes video bandwidth traffic.

19. The method of claim 13, the method including a video capture program and the different application includes a video analysis program.

20. The method of claim 8, the method including providing data collection software to receive the response information into the data collection device.

21. The method of claim 20, the method including providing question templates with the data collection software.

22. A method of processing electronic data, comprising:

receiving data in an unlocked form into a number of different records on a data collection device;

locking the data on the data collection device so that individual records are still repeatedly operable upon, including readable and editable, but cannot be operated upon by analysis software to aggregate and analyze the data between different records without being unlocked;

selecting data to be unlocked;

determining a fee to charge based on a user controlled selection of a volume and a type of the selected the data to be unlocked;

receiving a request to unlock the selected data by an electronic fee determination device;

receiving a number of keys to unlock the selected data such that the particular key enables access to the selected data by analysis software to aggregate and analyze unlocked data between different records;

unlocking the selected data associated with the received number of keys; and executing analysis software that is not tied to and is not specifically compiled and associated with the selected and the unlocked data to analyze between and electronically aggregate results of the unlocked data between different records.

23. The method of claim 22, wherein the method includes allowing the data to be revised or deleted on the data collection device while locked.

24. The method of claim 22, wherein the method includes:

aggregating the unlocked data; and performing statistical analysis on the aggregated unlocked data.

* * * * *